Sept. 19, 1944.　　　K. W. COUSE　　　2,358,446
PORTABLE EMERGENCY WORK AND SUPPLY SHOP
Filed Oct. 31, 1942　　　16 Sheets-Sheet 1
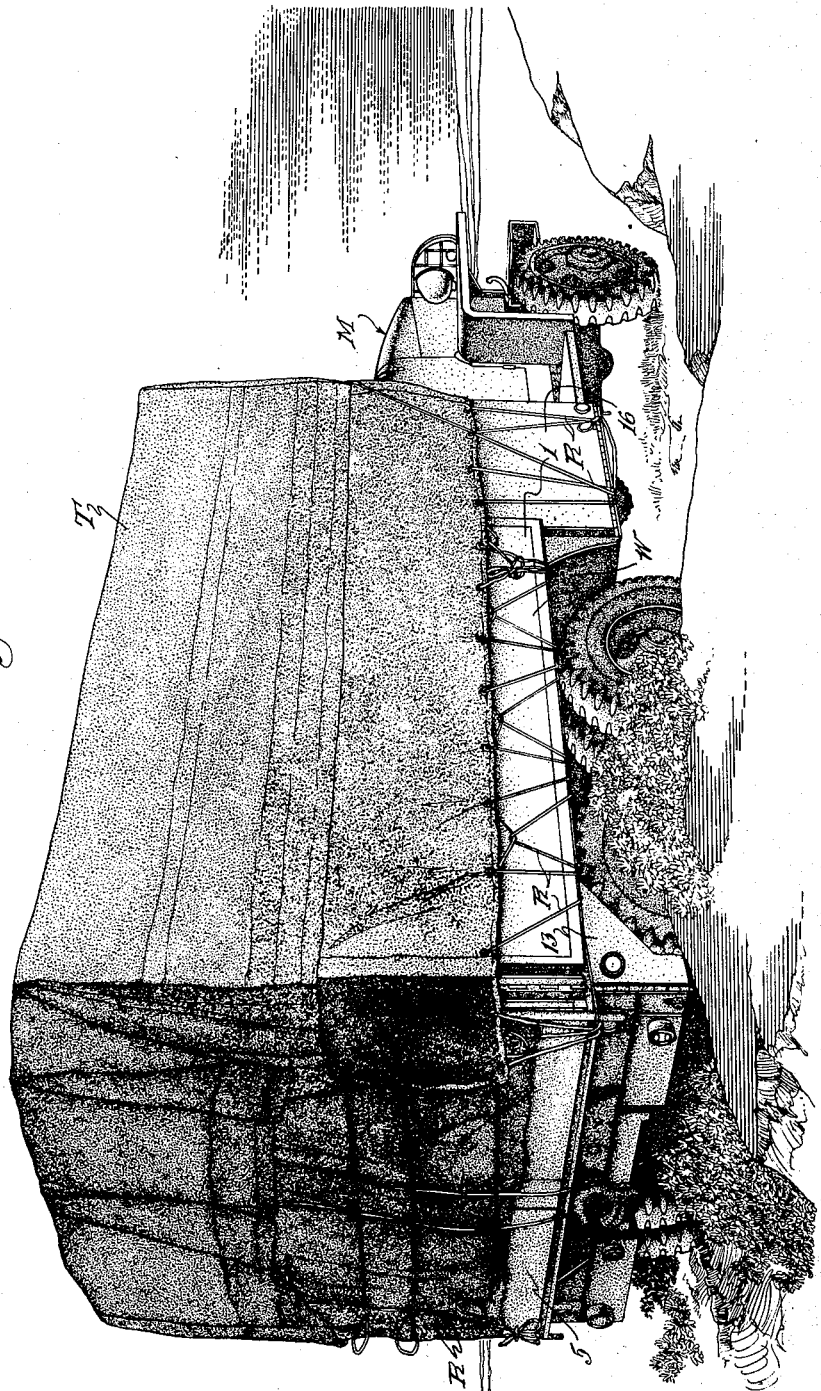
INVENTOR
Kibbey W. Couse
BY
A. D. T. Libby
ATTORNEY

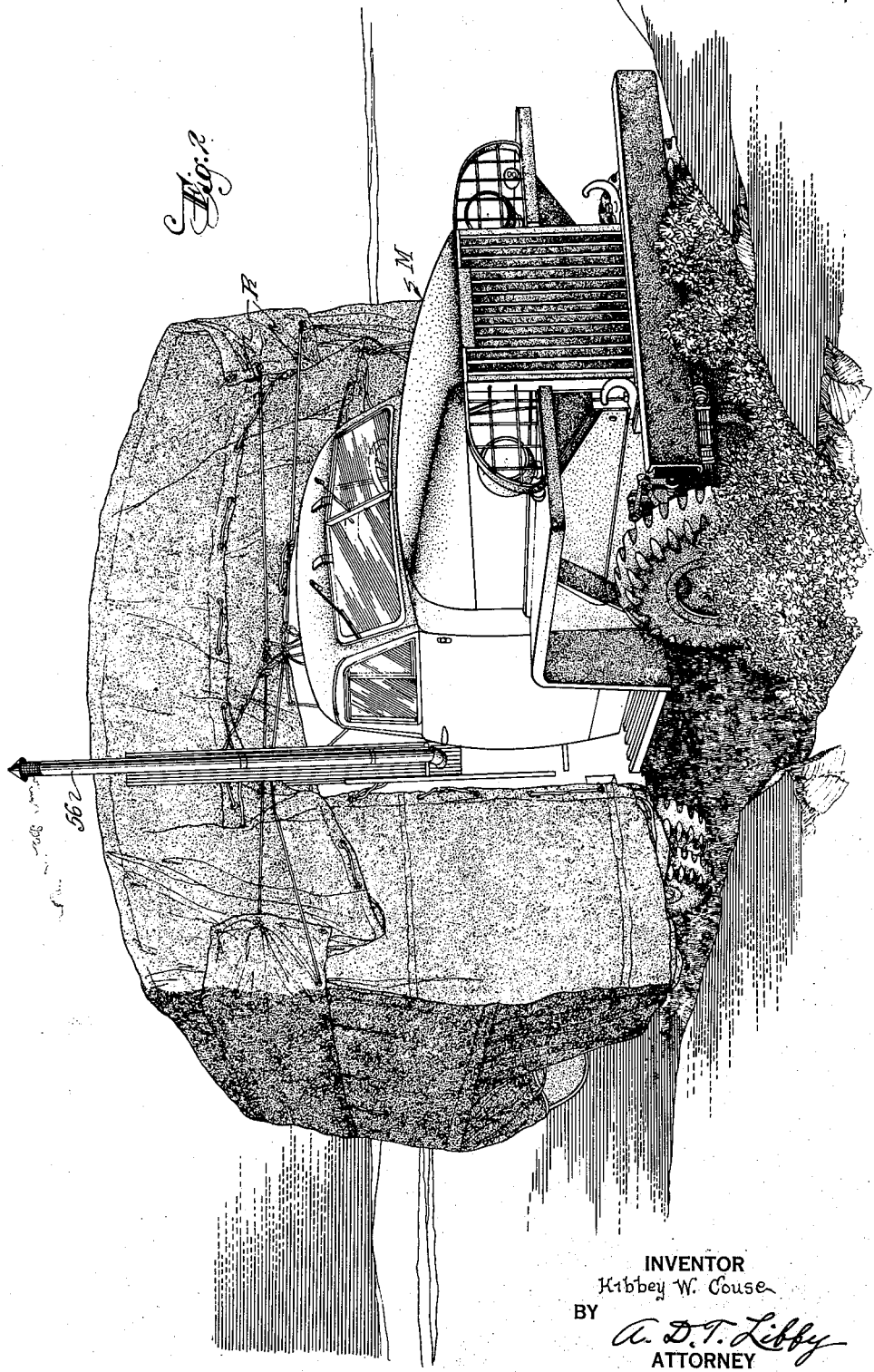

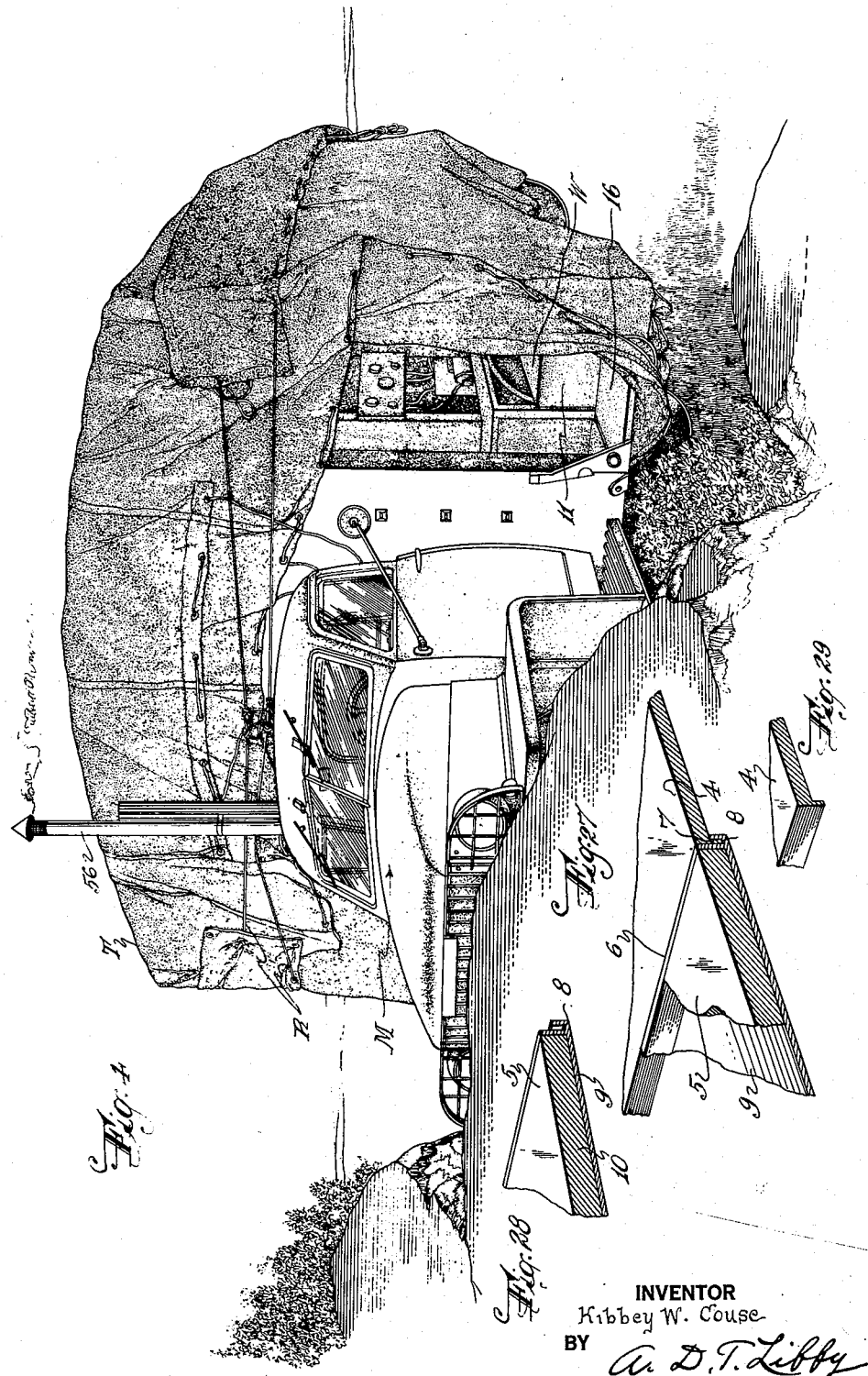

Sept. 19, 1944. K. W. COUSE 2,358,446
PORTABLE EMERGENCY WORK AND SUPPLY SHOP
Filed Oct. 31, 1942 16 Sheets-Sheet 4
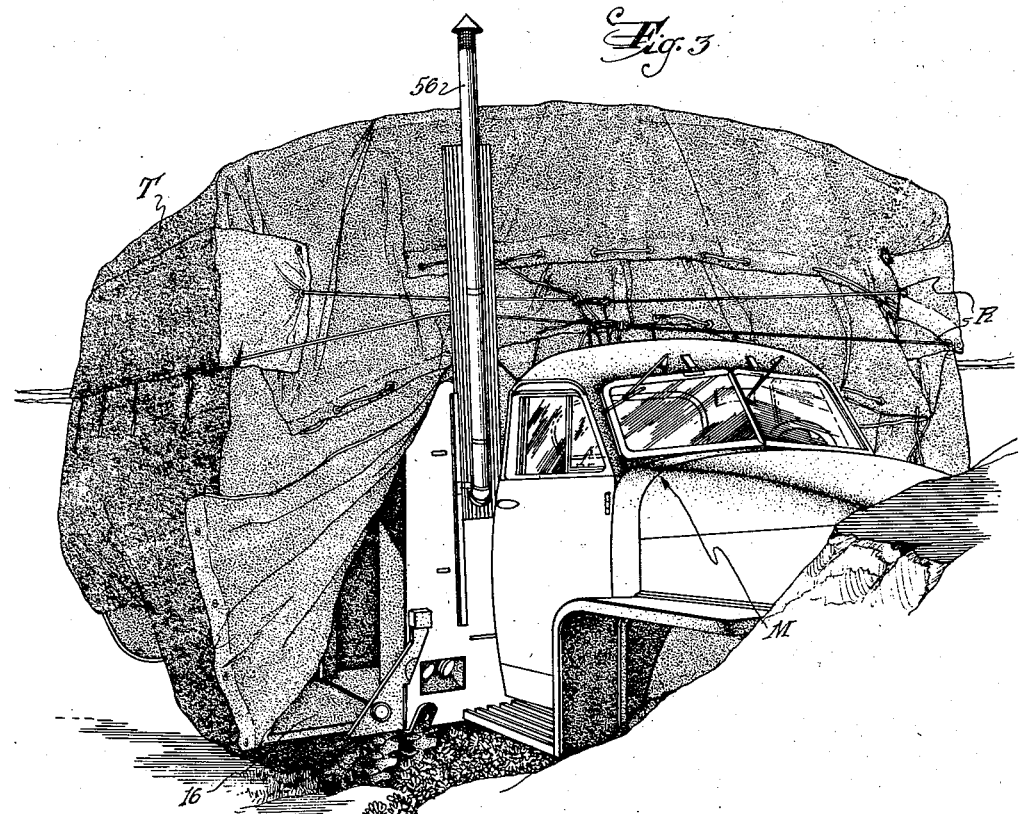
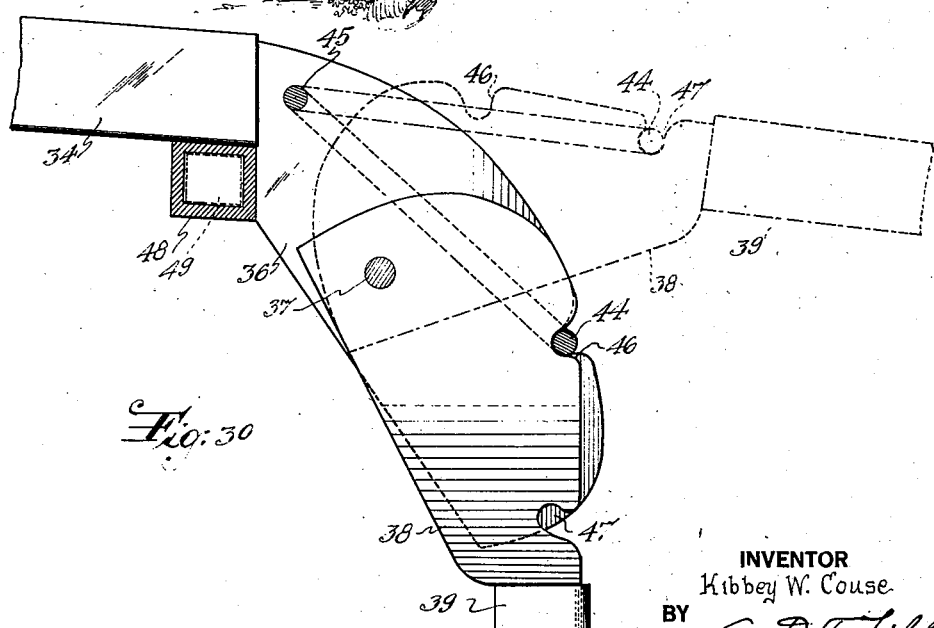
INVENTOR
Kibbey W. Couse
BY
ATTORNEY

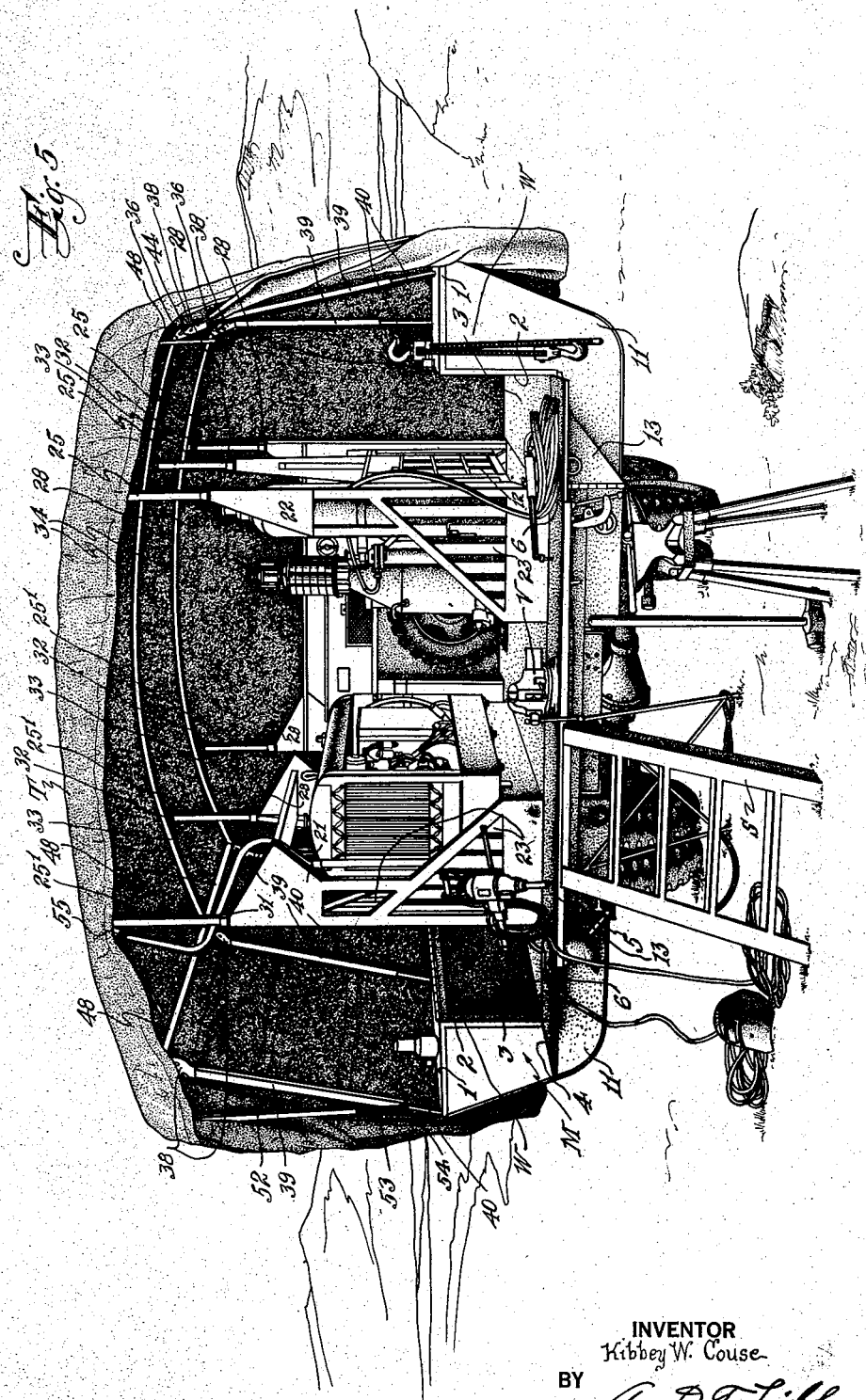

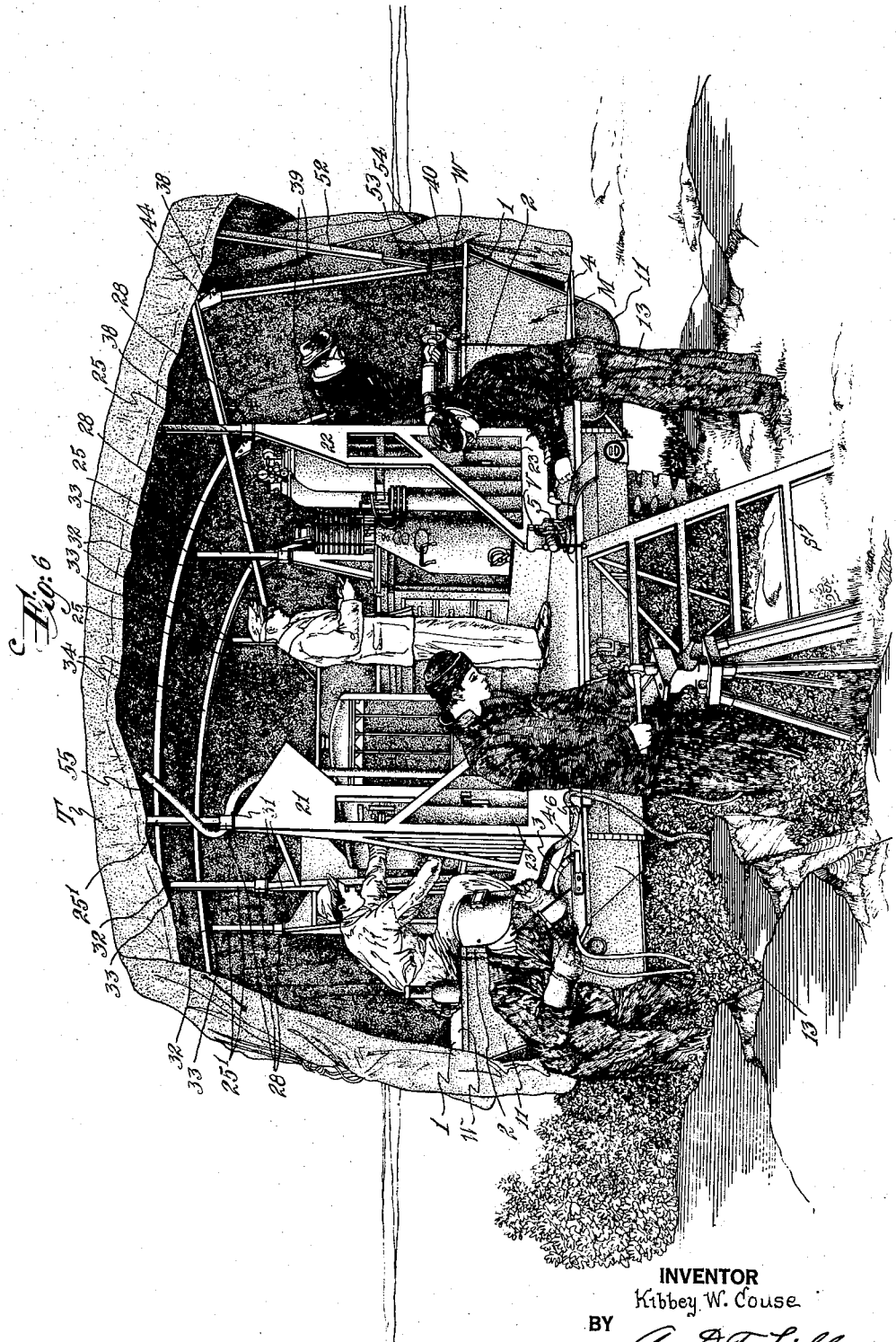

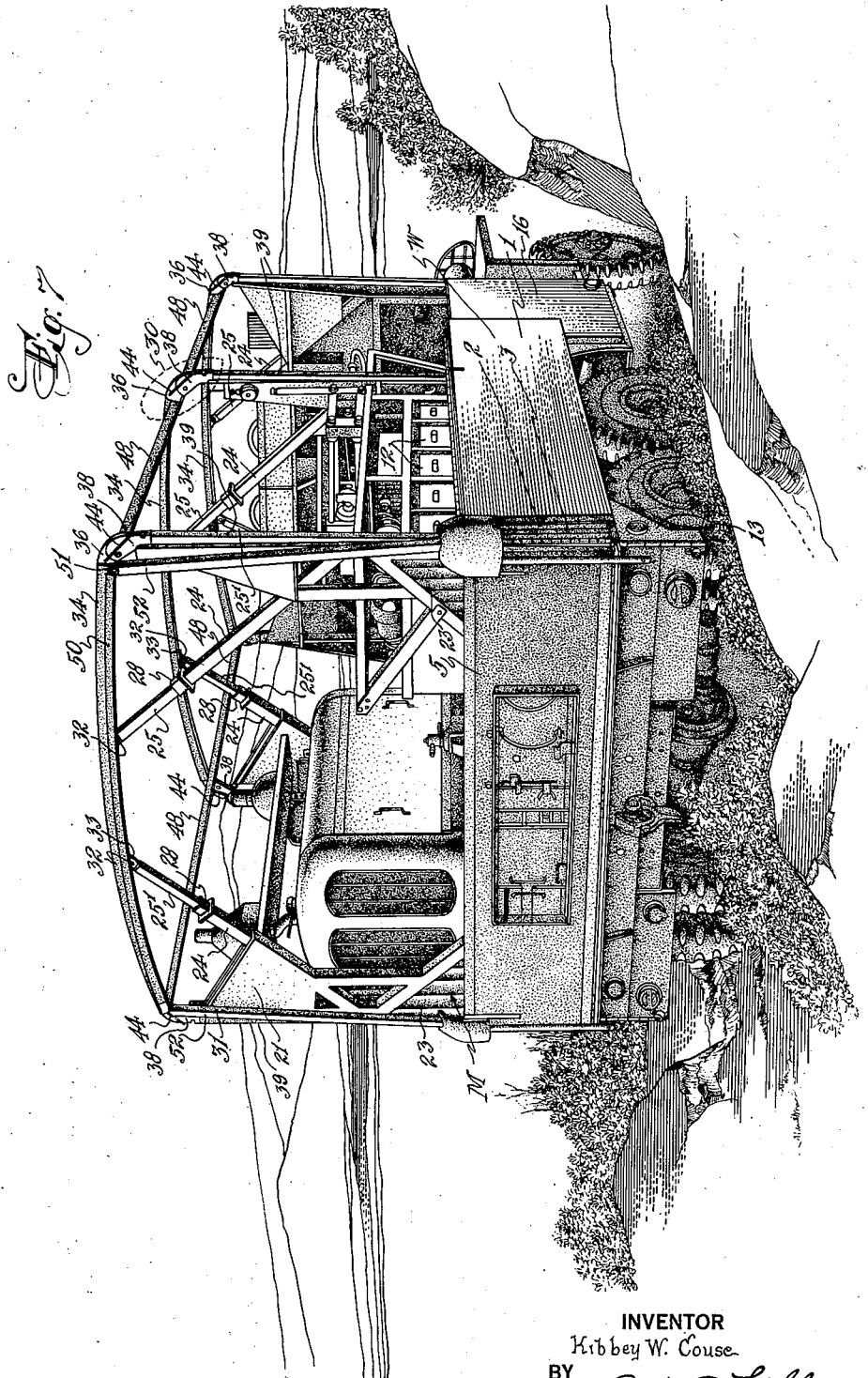

Sept. 19, 1944.  K. W. COUSE  2,358,446
PORTABLE EMERGENCY WORK AND SUPPLY SHOP
Filed Oct. 31, 1942  16 Sheets-Sheet 8
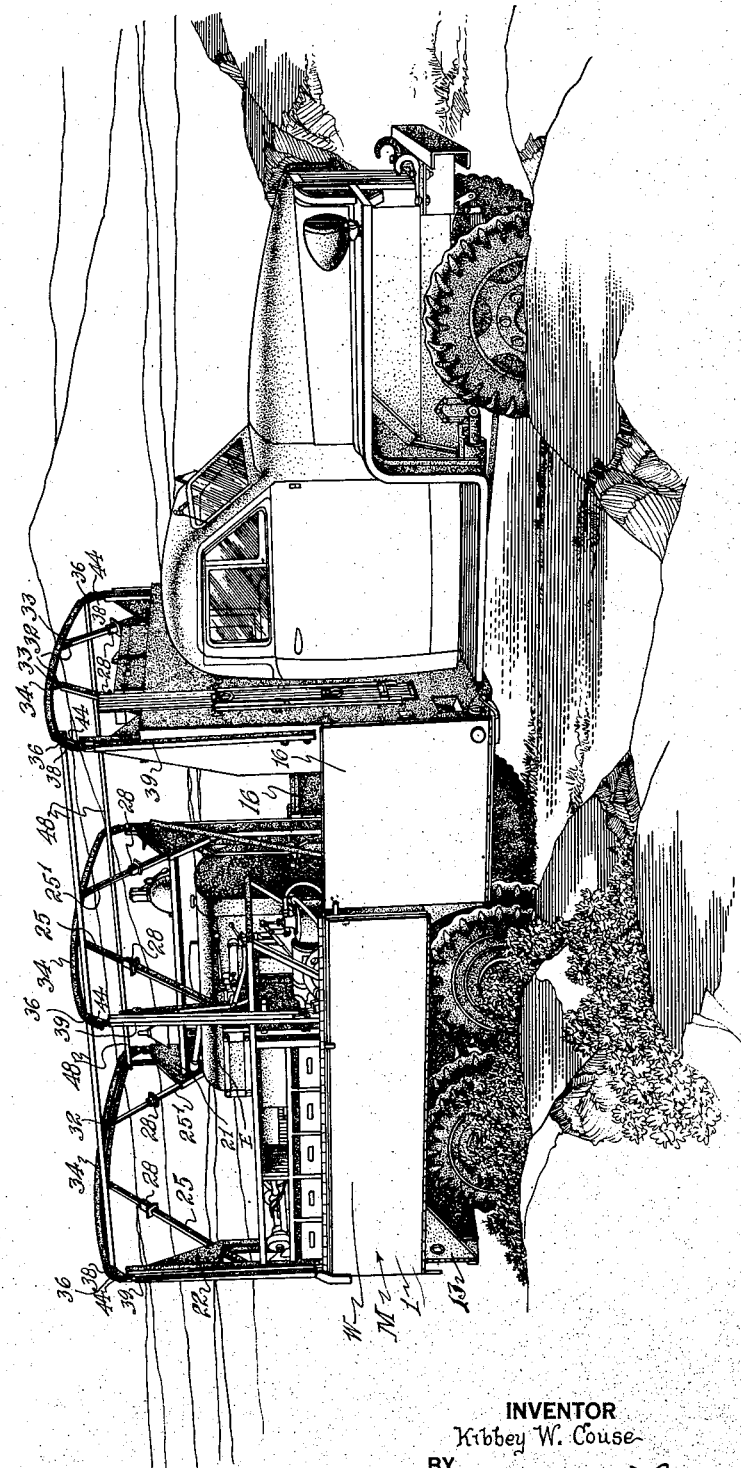
INVENTOR
Kibbey W. Couse
BY
ATTORNEY Sept. 19, 1944.  K. W. COUSE  2,358,446
PORTABLE EMERGENCY WORK AND SUPPLY SHOP
Filed Oct. 31, 1942  16 Sheets-Sheet 9
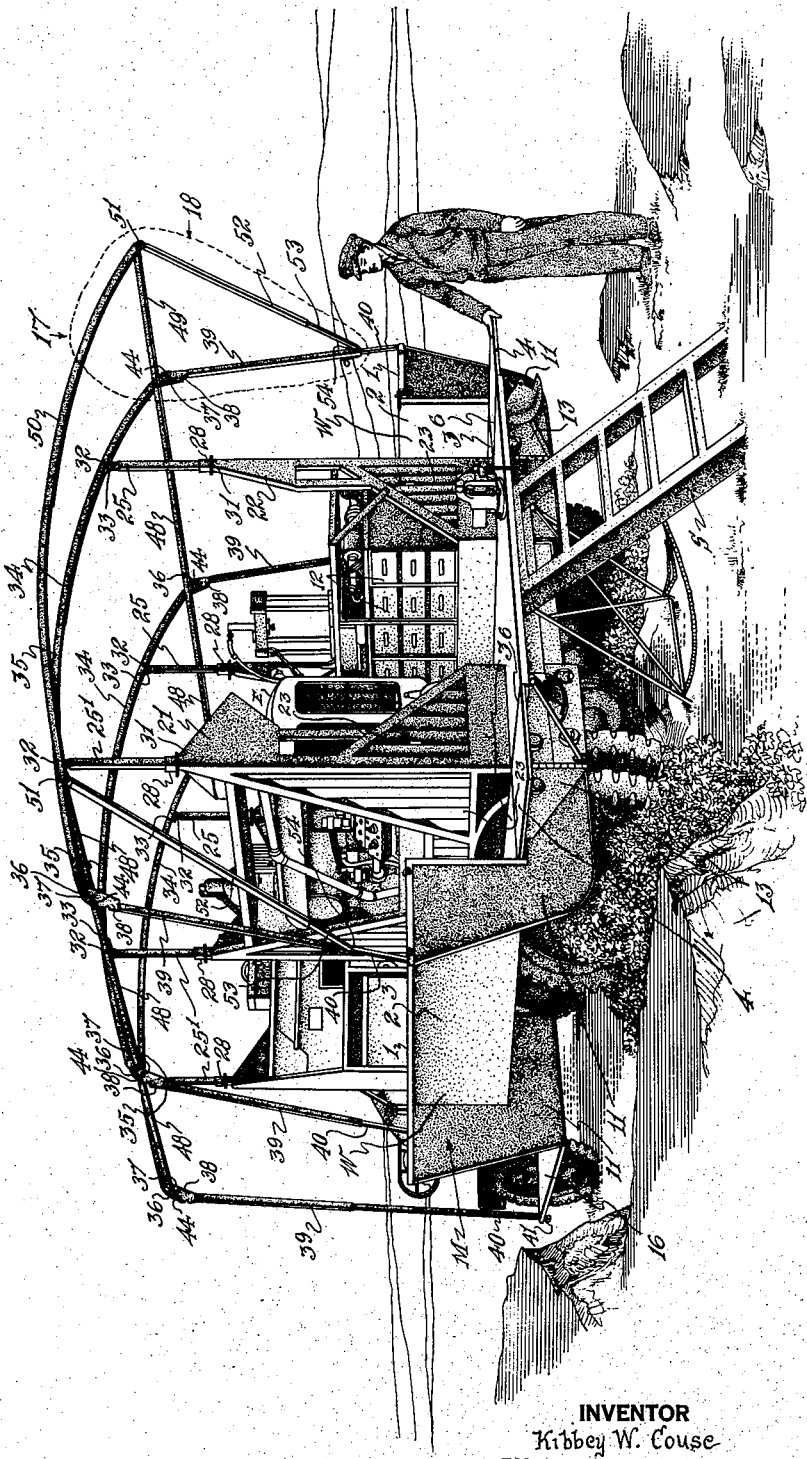
INVENTOR
Kibbey W. Couse
BY
A. D. T. Libby
ATTORNEY Sept. 19, 1944. K. W. COUSE 2,358,446
PORTABLE EMERGENCY WORK AND SUPPLY SHOP
Filed Oct. 31, 1942 16 Sheets-Sheet 10
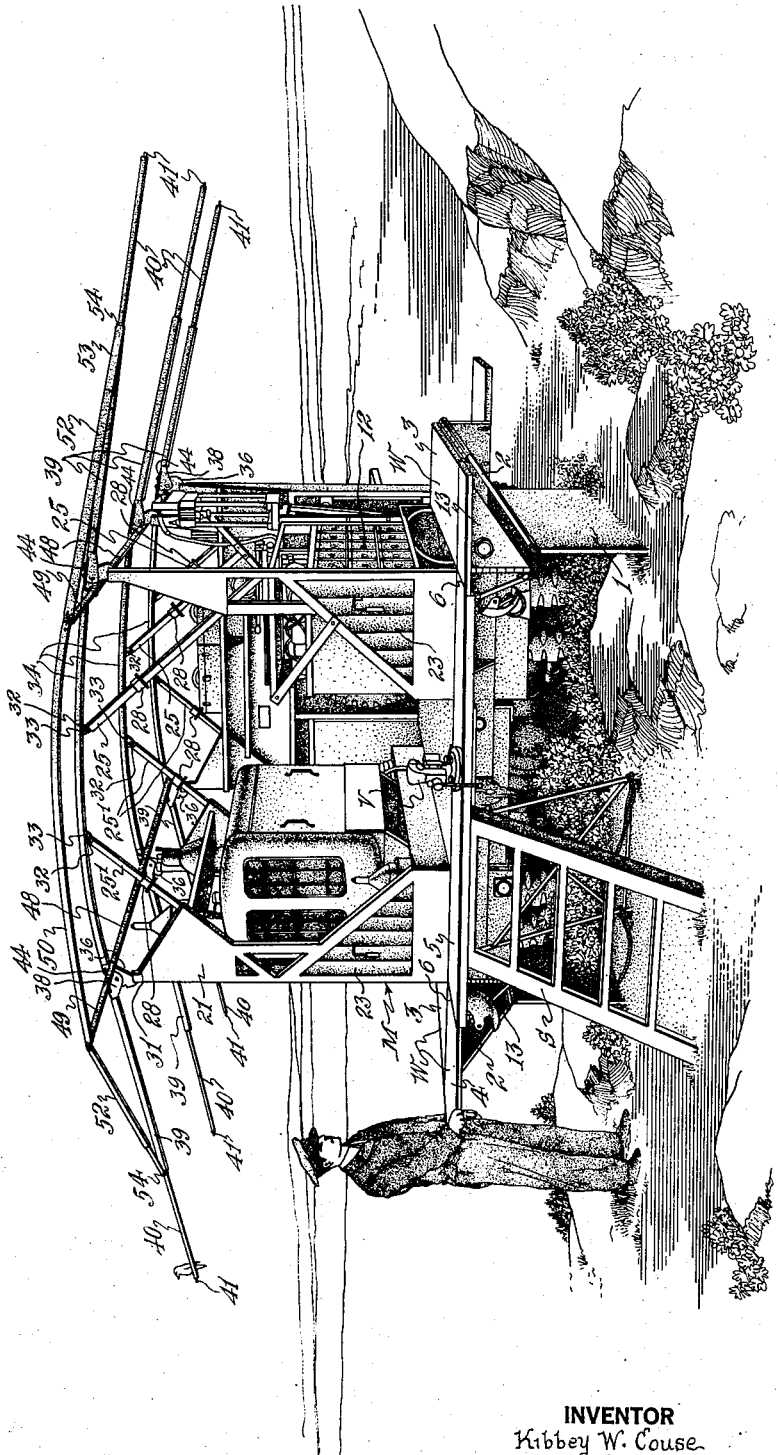
INVENTOR
Kibbey W. Couse
BY
A.D.T. Libby
ATTORNEY Sept. 19, 1944. K. W. COUSE 2,358,446
PORTABLE EMERGENCY WORK AND SUPPLY SHOP
Filed Oct. 31, 1942 16 Sheets-Sheet 11
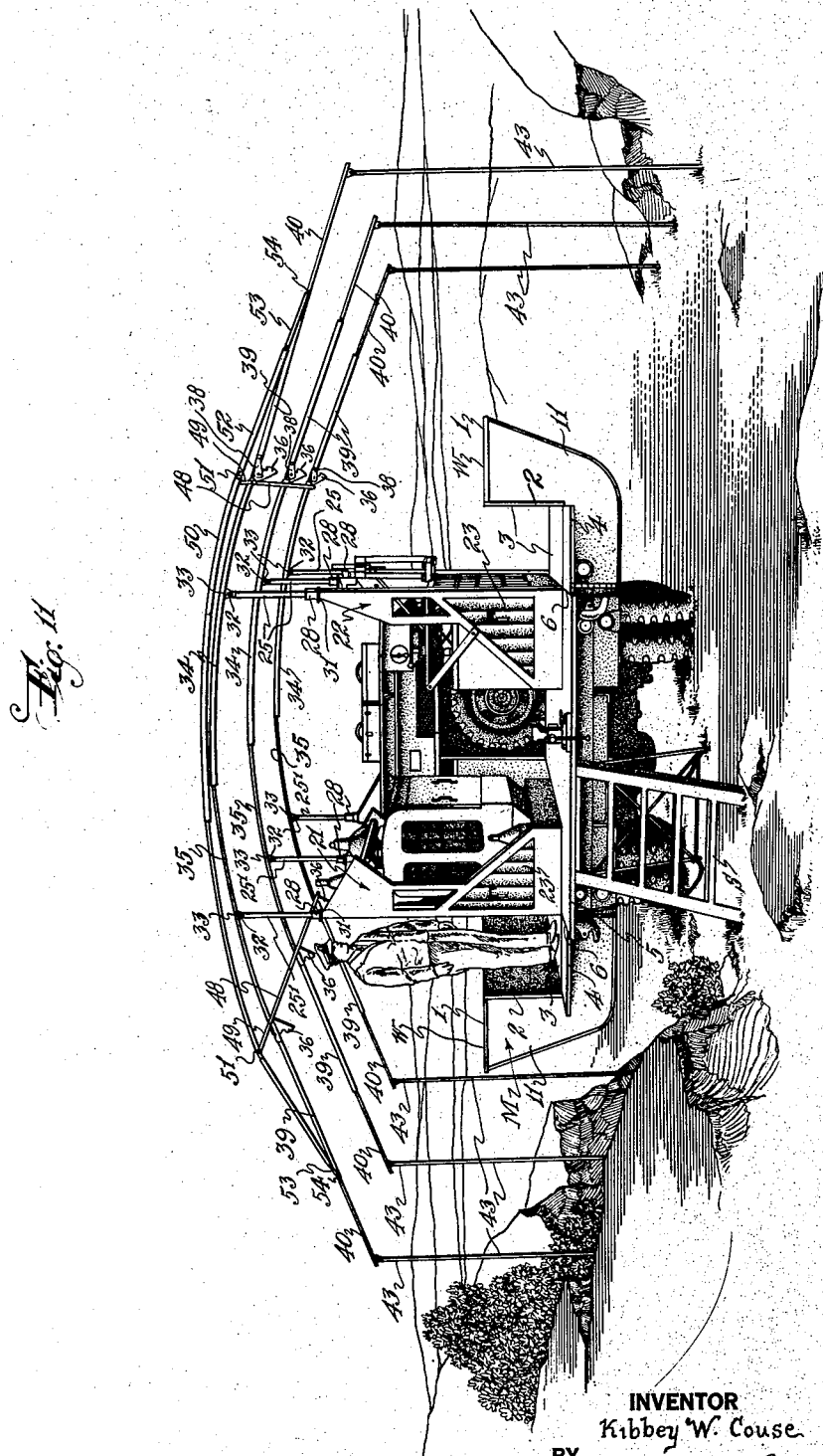
INVENTOR
Kibbey W. Couse
BY
A. D. T. Libby
ATTORNEY

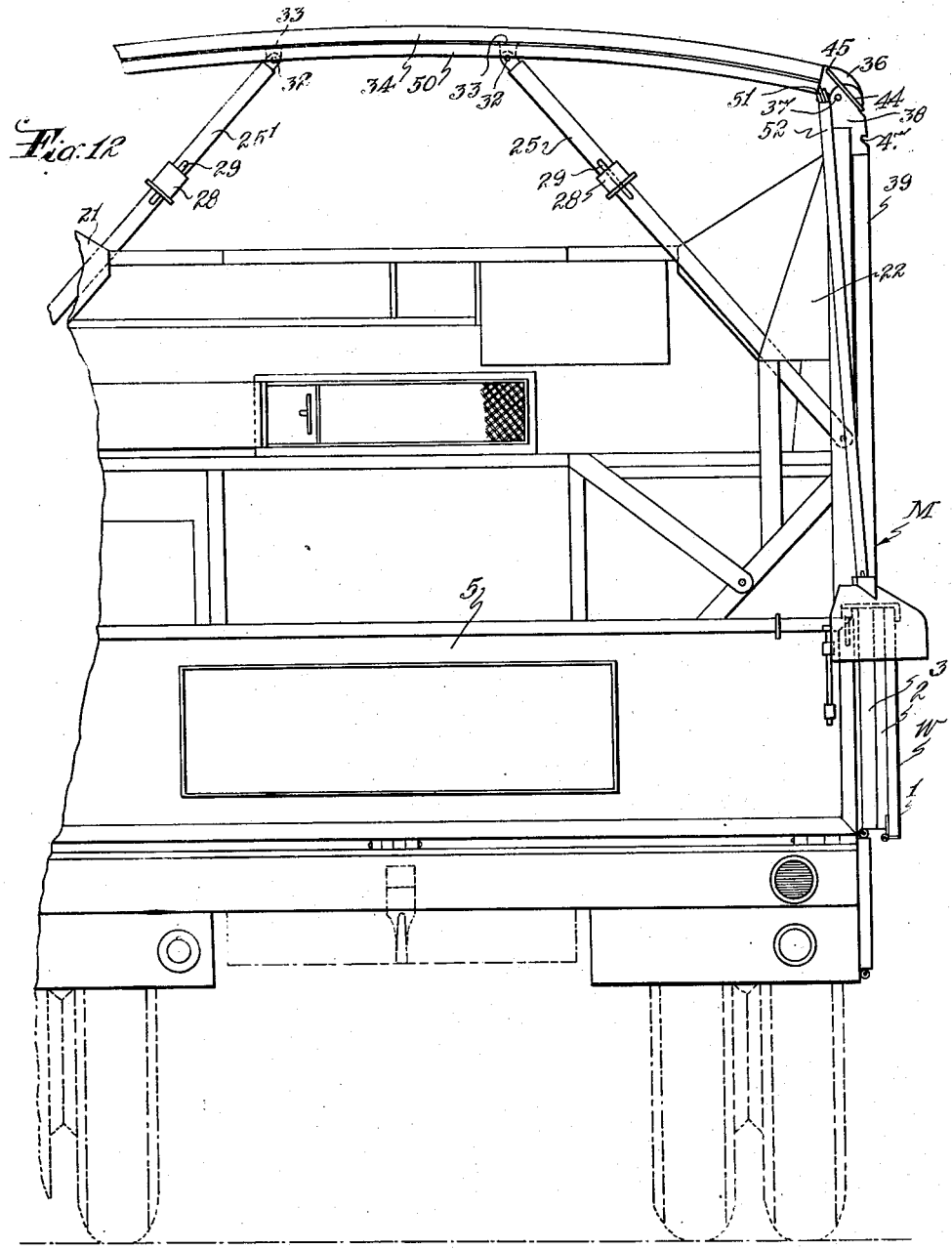

Sept. 19, 1944. K. W. COUSE 2,358,446
PORTABLE EMERGENCY WORK AND SUPPLY SHOP
Filed Oct. 31, 1942 16 Sheets-Sheet 13
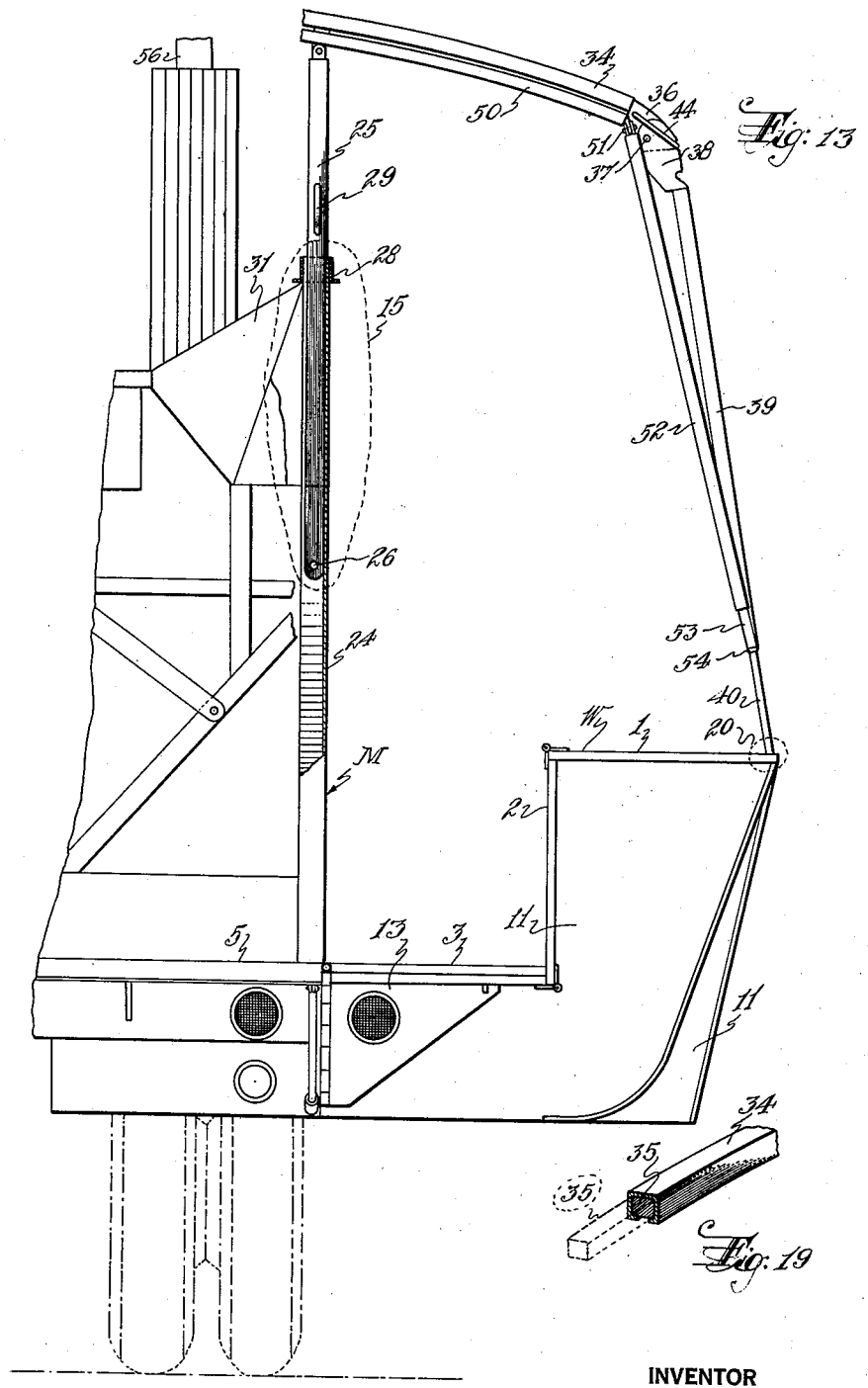
INVENTOR
Kibbey W. Couse
BY
A. D. T. Libby
ATTORNEY

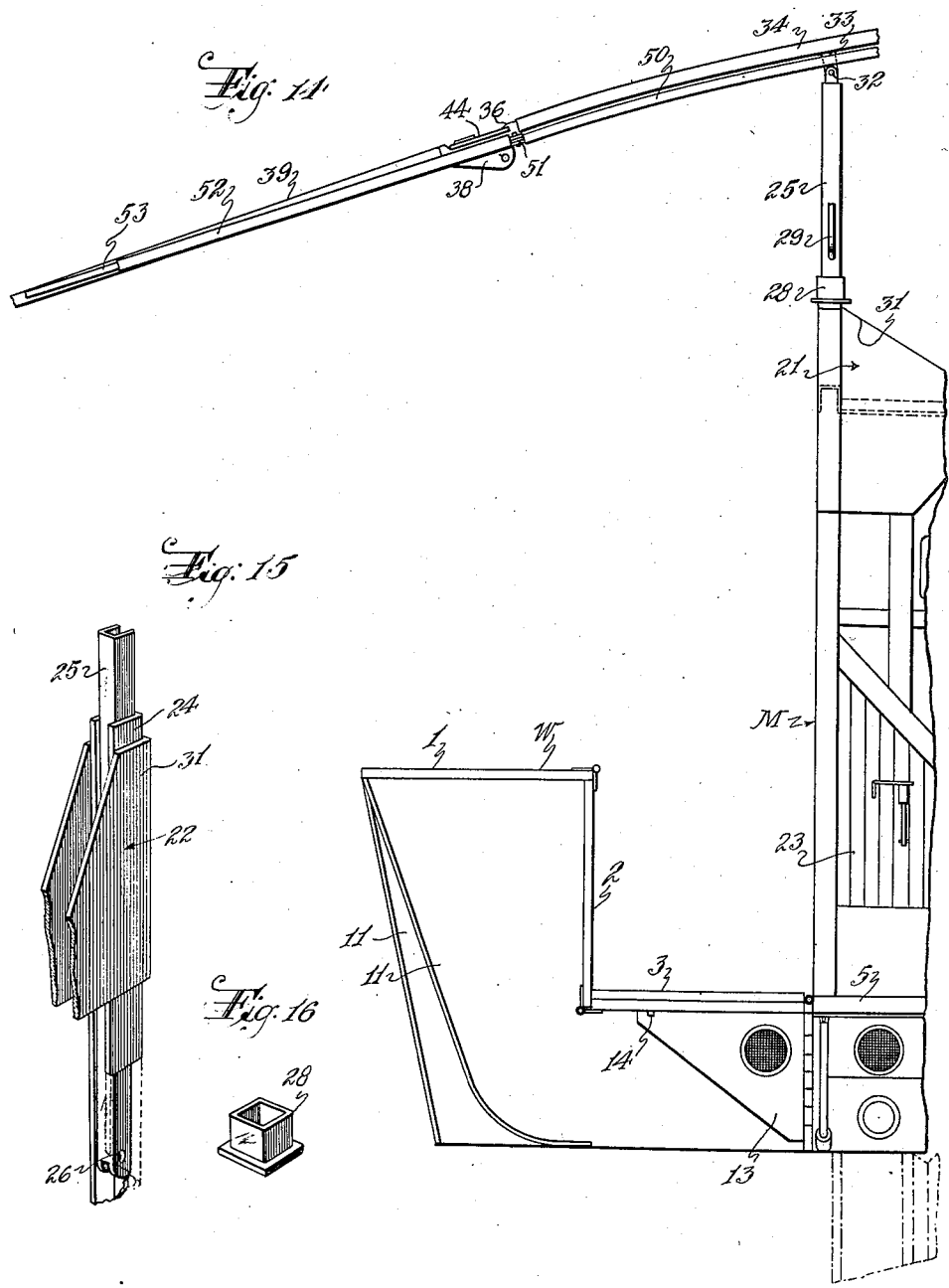

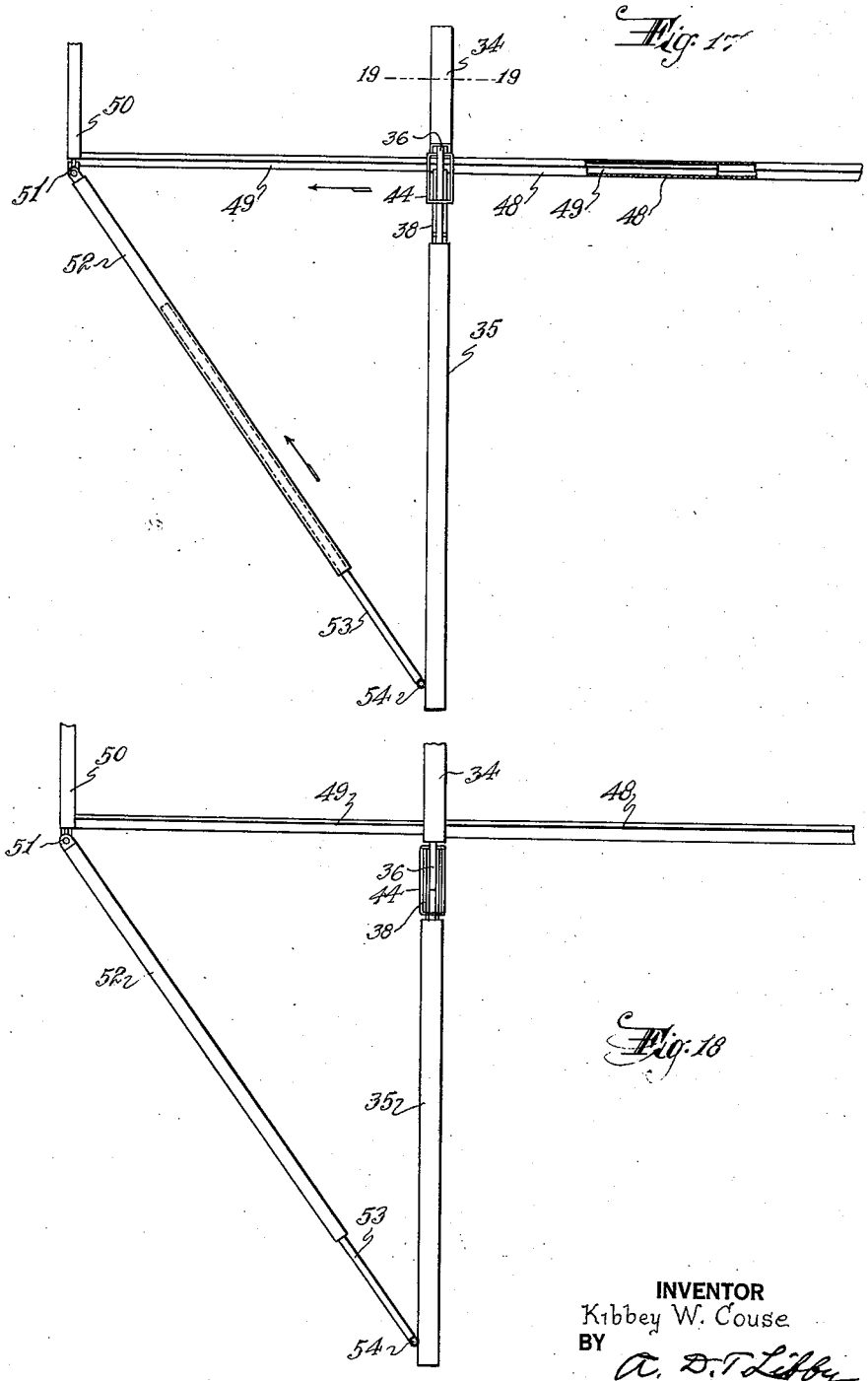

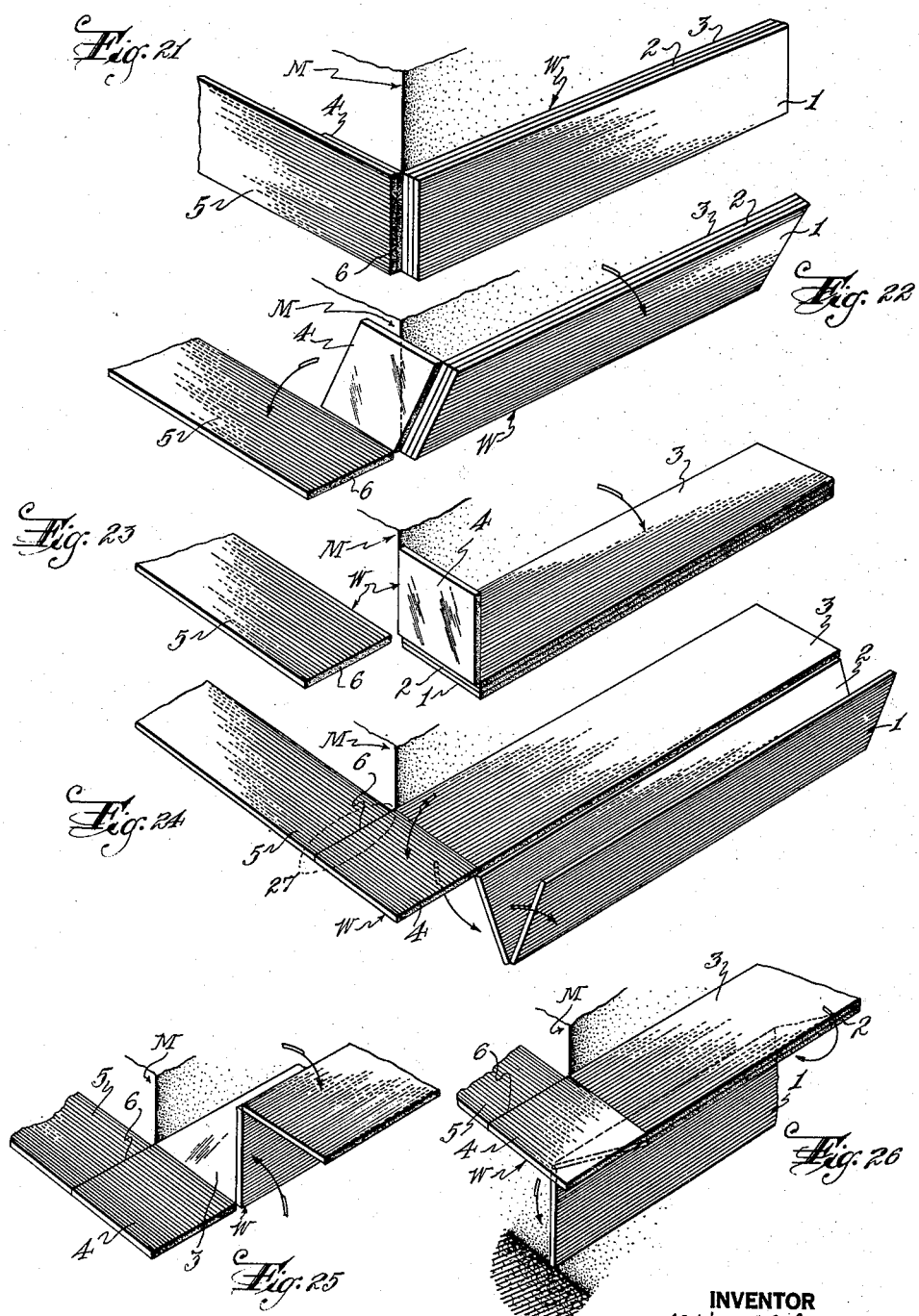

Patented Sept. 19, 1944

2,358,446

UNITED STATES PATENT OFFICE 2,358,446

PORTABLE EMERGENCY WORK AND SUPPLY SHOP

Kibbey W. Couse, Newark, N. J.

Application October 31, 1942, Serial No. 464,132

15 Claims. (Cl. 296—24)

This invention relates to a portable emergency work and supply shop as generally illustrated in my Design Patent D–109,942, issued May 31, 1938, but the type of conveyance to be hereinafter described incorporates many different and improved features whereby the traveling machine shop will fill a broader field of usefulness, especially for army use.

It is therefore the principal object of my invention to provide an army service truck which has a wide field of usefulness. Other objects will be discerned from the following description wherein:

Figure 1 is a perspective view of the machine shop in transit or ready for traveling use.

Figure 2 is a view taken from the front of the traveling machine shop shown in Figure 1, but with the sides or what will be hereinafter referred to as the catwalk let down to make more room inside the truck.

Figure 3 is a view of Figure 2 with the covering or canvas turned away to show an entrance onto the catwalk.

Figure 4 is a view similar to Figure 3 but of the opposite side of the truck.

Figure 5 is a view of the rear end of the truck with the covering or canvas removed to show catwalks on both sides and certain of the interior equipment, as well as work tables associated with the catwalks.

Figure 6 is a view similar to Figure 5 showing the personnel in various work positions.

Figure 7 is a view somewhat similar to Figure 1 but with the entire canvas or covering removed.

Figure 8 is a side view of Figure 7.

Figure 9 is a view somewhat like Figure 5, but with the canvas or covering removed.

Figure 10 is a skeleton view of the rear of the machine shop with the cover removed and certain cover-supporting members extended.

Figure 11 is a view similar to Figure 10, but showing auxiliary supports for the cover extensions shown in Figure 10, in position.

Figure 12 is an enlarged skeleton view of the rear of the truck with the cover removed.

Figure 13 is an enlarged skeleton view of a right-hand portion of Figure 9.

Figure 14 is an enlarged skeleton view of the left-hand corner of Figure 10.

Figure 15 is a fragmentary perspective view of the portion bounded by the dotted line 15 in Figure 13.

Figure 16 is a perspective view of a collar included within the area 15 of Figure 13.

Figure 17 is a view of the portion of Figure 9 bounded by the line 17 looking in the direction of the arrow.

Figure 18 is a view of the same area as Figure 17, but looking in the direction of the arrow 18.

Figure 19 is a view on the line 19—19 of Figure 17.

Figure 20 is a view on the dotted line 20 of Figure 13.

Figure 21 is a diagrammatic perspective view of the rear right-hand corner of the catwalk folded up.

Figure 22 is a view of the first step in the unfolding of the catwalk, no hinges being shown.

Figure 23 is a diagrammatic view of the next step in the unfolding of the catwalk, no hinges being shown.

Figure 24 shows the next step in the unfolding operation of the catwalk following that of Figure 23.

Figure 25 shows a further step in the operation of the unfolding of the catwalk and formation of the work-shelf, there being no ground support as illustrated in Figure 11.

Figure 26 is a view similar to Figure 25 of a modified form showing a ground support for the work-shelf as illustrated in Figure 10.

Figure 27 is a perspective view, partly in section, of the portion in the vicinity of the dotted line 27 of Figure 24.

Figure 28 is a view of the left-hand portion of Figure 27.

Figure 29 is a perspective view of the right-hand portion of Figure 27.

Figure 30 is an enlarged view of the area within the dotted line 30 of Figure 7.

In the various views, wherein like numbers refer to corresponding parts, M refers generally to the traveling machine shop or truck which is ready to move, all as shown in Figure 1. All of the material and apparatus carried by the truck is enclosed within a canvas or tarpaulin T which is securely tied down to the chassis by ropes R. The two sides and rear portion of the chassis are equipped with foldable portions W which, as shown in Figure 1, are all folded up and held at least partially in place by the ropes R. When it is desired to use the truck for certain machine shop operations, the top structure and the catwalk are moved to the positions shown in Figures 5 and 6.

In the operation of unfolding the catwalk, reference is made to Figures 21 to 26 inclusive. In these figures the side portion of the catwalk W is made up of three longitudinal sections 1, 2 and 3, and a small end portion 4 which is hinged to the part 3, the hinges not being shown. As shown in Figure 21, the part 4 is folded between the end piece 5 and the chassis super-structure. Figure 22 shows the rear part 5 tipped down to its horizontal position and the parts 1, 2, 3 and 4 are shown at a different angle than in Figure 21. In Figure 23 the parts 1, 2 and 3 are shown in horizontal position, while the part 4 has assumed a vertical position, ready to be turned down to line up with the end 6 of the rear board 5 as shown in Figure 24, which illustrates the next step of the unfolding of the side boards. It may be noted at this point that I prefer to make at least some of the boards out of a combination of wood and steel, or all steel. For example, the corner board 4 is preferably made out of steel and is provided with a lip 7 adapted to engage a groove 8 formed in a piece of steel 9 having a wooden insert 10, the two together forming the rear board 5. Therefore, it will be seen that when the boards 4 and 5 are in the position shown in Figures 24 and 27, they are locked together, and since 4 is hinged horizontally to 3, these parts 3, 4 and 5 form a stable support.

The final step of the unfolding of the catwalk is shown in Figure 25, wherein the part 1 becomes a horizontal shelf or seat as is clearly illustrated in Figures 5, 6 and 11. Supports 11 at each end of the catwalk on each side of the truck are attached to the chassis super-structure and to the edges of the parts 1, thereby forming an outboard support for the shelves independent of any ground support. By "chassis" I mean "the under part of an automobile consisting of the frame (on which the body is mounted) with the wheels and machinery" to which I add a cab, because in this type of vehicle the cab is usually separate from the body and is considered part of the chassis. To the chassis as above defined is directly fastened a super-structure, the parts of which will be hereinafter referred to.

Under some conditions of operation, the shelf or piece 1 may be folded down as illustrated in Figure 10 and become an outboard support for the walk 2, in which position supplies of various kinds may be handed out from the containers 12 carried on suitable shelves within the truck. When the catwalk parts are in the position shown in Figure 10, the tarpaulin T, which is shown removed for the purpose of illustrating certain interior parts of the truck, may hang down over the ends of the roofing supports and completely enclose the entire structure. In addition, triangular-shaped supports 13, which are hinged to the chassis super-structure and shown in folded-back position in Figure 7, are adapted to turn to the position shown in Figure 10 to form a support for the extremities of the walk pieces 3. A catch 14 (see Figure 14) is used to hold the part 13 in its shelf-supporting position.

As shown in Figure 10, mobile steps S, which are carried by the truck, are provided for cooperation with the rear shelf 5. The rear shelf 5 may carry certain fixtures such as a vise V. A step plate 16, one on each side (see Figures 3 and 4) is let down at the forward ends of the catwalks so as to make suitable access thereto from the front end of the truck.

In order to cover the catwalk and work-shelf, which is necessary during inclement weather or during blackouts, the tarpaulin cover members are partially extended as shown in Figures 5 and 6, or completely extended as shown in Figure 11, the tarpaulin, however, not being shown in Figure 11.

The tarpaulin is supported by a plurality of structural steel units, three being illustrated in Figures 7, 8 and 9. The rear unit, see for example Figures 10 and 11, is composed of two corner structures 21 and 22. These end members or posts are made up from structural steel reinforced by corrugated members 23 for added strength and lightness. Each of the corner members 21 and 22 includes a channel iron 24 fastened to the chassis super-structure frame member as by welding, within which is positioned a steel member 25 that may be in the form of a channel as illustrated in Figure 15 and is pivotally mounted at 26 on the channel iron 24. Located on the member 25 is a collar 28 which is slidable a certain distance on the member 25 but frictionally held by a spring 29. As shown in Figure 13, the collar 28 is positioned downwardly over the upper end of the channel iron 24 and is stopped by the angle iron portion 31 forming part of either one of the structures 21 or 22, so as to form a lock support for the member 25 to hold it in vertical position.

The upper end of the member 25 carries a pivot stud 32 which engages a lug 33 that is fastened as by welding to a roofing member 34 that telescopes over a cooperating member 35 (see Figure 11) which, in turn, is fastened to a corresponding member 25' on the opposite side of the truck. It may be noted that the member 34 may be in the form of a channel as shown in Figure 19.

Fastened to the member 34 (see Figure 30) as by welding, is a flat metal hinge plate 36 carrying a pin 37 on which is pivoted a plate 38 carried on the upper end of a member 39 within which is telescopically mounted a piece 40 which has a reduced threaded end 41 adapted to enter an aperture 42 in the shelf member 3 and fastened thereto by a lock washer and nut in the usual manner.

When the tarpaulin is to be carried out to its full limit, as illustrated in Figure 11, auxiliary supports 43 are removably attached to the members 40 so that the tarpaulin will extend out over the members 40 and downwardly to the ground outside the support members 43, thereby enclosing the entire machine shop, leaving a considerable space in and around the body portion of the shop.

Referring back to Figure 30, a link 44 pivoted at 45 to the member 36 is positioned in a notch 46 in the member 36 when the parts are in the position shown in Figure 9. When the parts are moved to the position shown in Figure 11, then one end of the link 44 is moved into a notch 47 in the member 38, the parts then assuming the position shown in dotted line in Figure 30. It may be noted at this point that the forward end support structures, corresponding to 21 and 22, are constructed in a somewhat similar manner, although the details are somewhat different; and, likewise, the central unit main supports follow the general plan of construction of 21 and 22, but are somewhat different in detail.

The roofing units are supported by oppositely positioned hollow tie rods 48 which are preferably welded to the parts 34 and 36, so that as the parts which have been described are moved to the positions shown in Figures 9 and 11, the tie rods move with them. Slidably positioned within each hollow tie rod at the rear end of the shop is a rod 49. At the outer end of each of the rods 49 is an auxiliary roofing member 50 made of two telescopic pieces the same as 34 and 35. Also pivotally mounted at 51 at the junction of 49 and 50, is a member 52 that is telescopically associated with a member 53 pivotally fastened at 54 to the member 35. The object of the extra roofing member 50 and cooperating parts is so that the tarpaulin may be pulled out over the rear catwalk 5 when in extended postion as shown in Figure 9, but from what has been said, it will be seen that it is readily extended and folded up without interfering with the other foldable members.

By reference particularly to Figures 4, 8 and 11, it will be seen that when the step plate 16 of Figure 8 is dropped to the position shown in Figure 4, there is a complete passageway all around the body of the machine which is entirely enclosed so that various kinds of machine work may be performed completely within the enclosure.

While various pieces of machine shop equipment, tools and materials necessary for repairs of army equipment of all kinds are carried by the truck, it may be mentioned specifically that one of the pieces of equipment may be an internal combuston engine to be used as an auxiliary source, outside of the vehicle-propelling engine, to supply power to the various pieces of apparatus, or for operating a cooling system where the shop is to be used in very hot climates; or it may be used for heating purposes when the shop is used in very cold localities. In either case, the exhaust may be from a pipe 55 coming out of the vehicle rearwardly of the tarpaulin, or it may run into a pipe 56 which forms an exhaust for an auxiliary heating unit such as a stove.

While I have shown in the various views the general arrangement of the emergency work and supply shop and certain of the details for changing its operating characteristics, it will be obvious that the details may be changed over a wide range without departing from the spirit of my invention or the scope of the appended claims.

What I claim is:

1. A portable shop of the type described herein comprising an automotive chassis including a cab, a super-structure fastened to the chassis, a plurality of foldable plates or boards foldably mounted along the sides and rear end of the chassis super-structure to form, when folded, a firm low-body enclosure directly on and extending above the chassis super-structure and, when unfolded, a catwalk around the greater portion of the chassis super-structure and supported thereon, frame members comprising a plurality of roof-supporting units supported on and preferably fastened directly to the chassis super-structure and extending upwardly therefrom in spaced relation, each unit having fixed and slidably extensible cooperative parts including oppositely disposed tie rods, whereby the roof supports may be laterally and vertically extended, and the tie rods longitudinally extended at least at the rear end of the shop, over and a substantial distance beyond the catwalk if desired, flexible cover means adapted to be pulled on and down over as well as off said units for completely covering them or any of said extensions thereof, especially the catwalk, as well as said distance beyond, or for exposing parts or all of the equipment carried in the shop or positioned on portions of the catwalk.

2. An automotive structure as set forth in claim 1, further defined in that the foldable parts along each side of the chassis super-structure are three in number, one serving as a footwalk, one as a shelf and one as a side for closing the space between the shelf and the footwalk, with means for supporting these parts from the chassis super-structure.

3. An automotive structure as set forth in claim 1, further defined in that the foldable parts along each side of the chassis super-structure are three in number, one serving as a footwalk, while the other two act as an outboard support for the footwalk.

4. An automotive structure as set forth in claim 1, further defined in that the foldable parts along each side of the chassis super-structure are three in number, one serving as a footwalk, one as a shelf and one as a side for closing the space between the shelf and the footwalk, with means for supporting these parts from the chassis super-structure, and further defined in that each footwalk plate at the rear end of the chassis super-structure has a corner board or plate hinged thereto for movement into cooperative position with the rear end catwalk plate or board to complete the catwalk at the rear of the chassis super-structure.

5. An automotive structure as set forth in claim 1, further defined in that the foldable parts along each side of the chassis super-structure are three in number, one serving as a footwalk, one as a shelf and one as a side for closing the space between the shelf and the footwalk, with means for supporting these parts from the chassis super-structure, and further defined in that each footwalk plate at the rear end of the chassis super-structure has a composite corner board hinged thereto for movement into cooperative position with the rear end catwalk board, the two having interlocking edges to complete the catwalk at the rear end of the chassis super-structure.

6. An automotive structure as set forth in claim 1, further defined in that the foldable parts along each side of the chassis super-structure are three in number, one serving as a footwalk, one as a shelf and one as a side for closing the space between the shelf and the footwalk, with means for supporting these parts from the chassis super-structure, and further defined in that each footwalk plate at the rear end of the chassis super-structure has a corner board or plate hinged thereto for movement into cooperative position with the rear end catwalk plate or board to complete the catwalk at the rear of the chassis super-structure, and still further defined in that a step plate is hinged to the chassis super-structure, one on each side at the forward part thereof just back of the cab for completing the catwalk at this end of the chassis super-structure.

7. An automotive structure as set forth in claim 1, further defined in that each of said frame members includes a pair of members, the bottom one being fastened to a chassis super-structure member, while the top one is pivoted to the bottom one intermediate its ends, movable means for securely holding the pair of members in vertical position and for allowing the top one to be moved inwardly at an angle, telescopically arranged transverse primary roofing members fastened to the outer ends of said oppositely disposed pivoted members, and outboard supports pivotally connected to the outer ends of said primary roofing members.

8. An automotive structure as set forth in claim 1, further defined in that each of said frame members includes a pair of members, the bottom one being fastened to a chassis super-structure member, while the top one is pivoted to the bottom one intermediate its ends, movable means for securely holding the pair of members in vertical position and for allowing the top one to be moved inwardly at an angle, telescopically arranged transverse primary roofing members fastened to the outer ends of said oppositely disposed pivoted members, and outboard supports pivotally connected to the outer ends of said primary roofing members, said outboard supports having telescopically arranged parts whereby when they are moved to one pivoted position the roof may be extended to maximum position, and outboard supports for these further extended parts.

9. An automotive structure as set forth in claim 1, further defined in that each of said frame members includes a pair of members, the bottom one being fastened to a chassis super-structure member, while the top one is pivoted to the bottom one intermediate its ends, movable means for securely holding the pair of members in vertical position and for allowing the top one to be moved inwardly at an angle, telescopically arranged transverse primary roofing members fastened to the outer ends of said oppositely disposed pivoted members, and outboard supports pivotally connected to the outer ends of said primary roofing members, with means for locking said supports in either of two positions, one position being such that the cover means takes in the catwalk, the said supports having telescopically arranged parts so when they are moved to the other position and extended the cover means can be extended to include an area around the shop, and means for supporting the outer ends of said telescopically arranged supports.

10. An automotive structure as set forth in claim 1, further defined in that each of said frame members includes a pair of members, the bottom one being fastened to a chassis super-structure member, while the top one is pivoted to the bottom one intermediate its ends, movable means for securely holding the pair of members in vertical position and for allowing the top one to be moved inwardly at an angle, telescopically arranged transverse primary roofing members fastened to the outer ends of said oppositely disposed pivoted members, and combination telescopically arranged outboard support and roof extension members pivotally anchored to the outer ends of said primary roofing members, and longitudinally positioned brace members anchored to the ends of the primary roofing members adjacent said pivotal points.

11. An automotive structure as set forth in claim 1, further defined in that each of said frame members includes a pair of channel irons arranged in reverse position, one within the other, the bottom one being fastened in a vertical position to a fixed member on the chassis super-structure, while the top one is pivoted to the bottom one, movable means engaging the upper end of the bottom member for locking the said pair of members in vertical position and slidable on the top member, with means on the top member for holding said movable slidable member in unlocking position to allow the top member to be moved inwardly at an angle, telescopically arranged transverse primary roofing members fastened to the outer ends of said oppositely disposed pivoted members, and outboard supports pivotally connected to the outer ends of said primary roofing members.

12. A traveling emergency work and supply shop comprising an automotive chassis super-structure, a plurality of roof-supporting units carried by the chassis in spaced relation, said units having relatively light but strong members fixed to the chassis super-structure, members pivoted to said fixed members, telescopically arranged transversely positioned primary roof members attached to said pivoted members, extensible members pivoted to the ends of said primary roof members and forming outboard supports or auxiliary roof members and support members as desired, extensible cover means for covering said roof members and foldable plates or boards arranged along the sides and ends of the chassis super-structure for forming a catwalk around the chassis super-structure when desired.

13. A traveling emergency work and supply shop comprising an automotive chassis super-structure, a plurality of roof-supporting units carried by the chassis super-structure in spaced relation, said units having relatively light but strong members fixed to the chassis super-structure, members pivoted to said fixed members, telescopically arranged transversely positioned primary roof members attached to said pivoted members, extensible members pivoted to the ends of said primary roof members and forming outboard supports or auxiliary roof members and support members as desired, oppositely positioned brace members extending longitudinally of the chassis super-structure and anchored to the ends of the primary roof members adjacent said pivot points with the extensible members, extensible cover means for covering said roof members and foldable plates or boards arranged along the sides and ends of the chassis super-structure for forming a catwalk around the chassis super-structure when desired.

14. A traveling emergency work and supply shop comprising an automotive chassis super-structure, a plurality of roof-supporting units carried by the chassis super-structure in spaced relation, said units having relatively light but strong members fixed to the chassis super-structure, members pivoted to said fixed members, telescopically arranged transversely positioned primary roof members attached to said pivoted members, extensible members pivoted to the ends of said primary roof members and forming outboard supports or auxiliary roof members and support members as desired, oppositely positioned brace members extending longitudinally of the chassis super-structure and anchored to the ends of the primary roof members adjacent said pivot points with the extensible members, said brace members being hollow at least at the rear end of the chassis super-structure and carrying extensible parts and support members forming the longitudinally extending roof portion, extensible cover means for covering said roof members and foldable plates or boards arranged along the sides and ends of the chassis super-structure for forming a catwalk around the chassis super-structure when desired.

15. A traveling emergency work and supply shop comprising an automotive chassis super-structure, a plurality of roof-supporting units carried by the chassis super-structure in spaced relation, said units having oppositely disposed parts fixed to the chassis super-structure and carrying pivotally movable parts, laterally movable parts supported by said movable parts with outboard supports therefor, extensible cover means for covering said roof units, foldable members along at least the two sides and rear end of the chassis super-structure for forming a catwalk around the chassis super-structure, and an auxiliary roof-supporting unit carried mainly by members supported by the first-mentioned units, said auxiliary unit being located at the rear end of the shop and being longitudinally and laterally extensible with the cover means to cover the rear part of the catwalk.

KIBBEY W. COUSE.